United States Patent [19]

Anderson

[11] 4,236,824
[45] Dec. 2, 1980

[54] METHOD FOR CORRECTION OF FORGED OPTICAL ELEMENTS

[75] Inventor: Rogers H. Anderson, Bloomington, Minn.

[73] Assignee: Honeywell Inc., Minneapolis, Minn.

[21] Appl. No.: 50,838

[22] Filed: Jun. 21, 1979

[51] Int. Cl.³ .............................................. G01B 11/00
[52] U.S. Cl. .................................... 356/359; 350/178; 356/360
[58] Field of Search ................. 350/178; 356/359, 360

[56] References Cited

U.S. PATENT DOCUMENTS 3,693,301  9/1972  Lemaitre .......................... 350/178 X Primary Examiner—John K. Corbin
Assistant Examiner—Matthew W. Koren
Attorney, Agent, or Firm—Omund R. Dahle

[57] ABSTRACT

The optical surface figures of both optical surfaces of a forged halide optical element can be corrected and optimized using an interferometer to observe the lens surface while applying pressure via gas to produce permanent deformation of the lens.

8 Claims, 3 Drawing Figures

(a)

(d)

(b)

(e)

(c)

(f)

METHOD FOR CORRECTION OF FORGED OPTICAL ELEMENTS

BACKGROUND AND SUMMARY OF THE INVENTION

The present invention was made under a contract with the Department of Defense.

In my U.S. Pat. Nos. 4,101,331 and 4,118,448, assigned to the same assignee as the present invention, there is described the preparation of IR transmissive fine-grained fully-dense halide optical elements such as windows and lenses. These halide elements are made by press forging of a crystal billet. Heat and force are applied to the halide crystal to reduce the dimension of the crystal in one direction while it is constrained to an extent in other directions such as by a copper constraining ring or by a fluid pressure applied to the halide so that cracking of the halide body is eliminated as the forging proceeds.

In the forging of KBr lens using a flat disc for the plano face and a convex die to produce the concave face, the resultant forging after cooling to room temperature is an occasion found to be somewhat convex on the "plano" face and also has a shorter radius than desired for the finished concave face. It is apparent that shrinkage of the lens during cooling from the forging temperature causes the edges of the plano side to tend to bend towards the concave side and thereby reduce its radius.

In this invention a process is taught for correction of the shape of the forged optical elements. By placing the lens in the fixture described in detail below, and pressurizing, the KBr lens is permanently deformed to optimize the desired radius of the concave side and the flatness of the plano side.

DESCRIPTION

Infrared transmissive lenses require special materials for low absorption in the 10.6 micron region and in the 2-6 micron region. The alkali halides exhibit low absorption at 10.6 microns and the alkaline earth halides exhibit low absorption at 2-6 microns. Potassium bromide lenses and other halide lenses are made by hot forging between optically polished dies using a high pressure helium environment inside the forging chamber, as taught in my patents listed above. This results in fine-grained fully-dense crack-free optical elements.

As has been described in the background, in the forging of KBr lens the resultant cooled lens is found to be somewhat convex on the "plano" face and also has a shorter radius than the design radius on the concave face.

Figure 1:
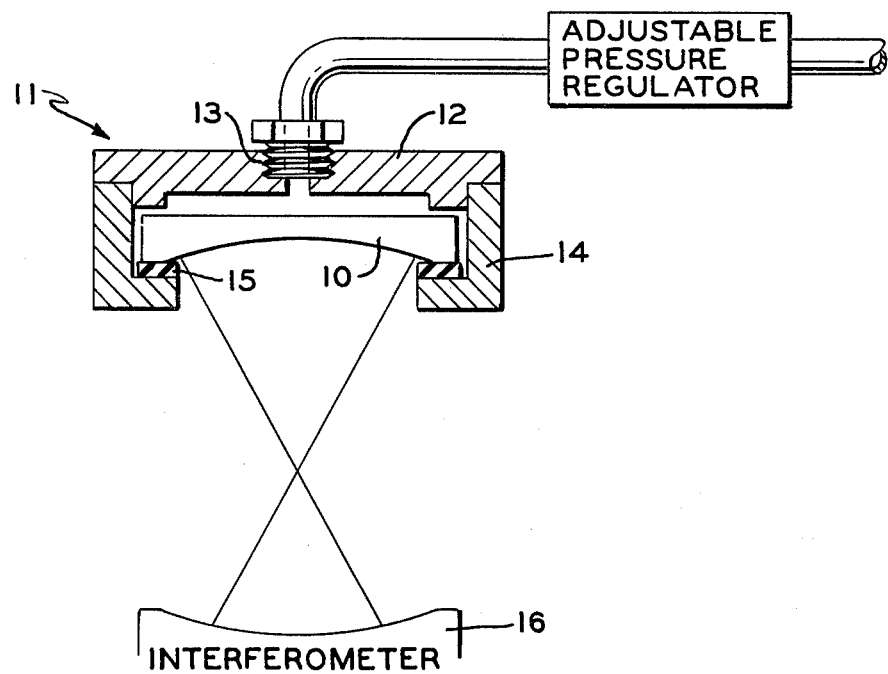
FIG. 1 schematically shows apparatus for accomplishing the method of the invention.

FIG. 1 shows my apparatus for bending the finished lens beyond its elastic limit by pressurizing one side of the lens with a gas, preferably helium, while the other side is exposed to atmospheric pressure.

Referring now to FIG. 1, the halide lens 10 is positioned in a fixture 11 for bending the lens. The fixture which is a small pressure chamber comprises a generally disc shaped portion 12 having an aperture 13 through which gas pressure is applied to the lens. A lens retaining ring 14 is threaded or is clamped in gas tight relation to portion 12. A sealing member such as a resilient "0" ring 15 cushions the lens and makes a gas tight seal between the lens and the lens retaining ring.

The surface of the lens is observed by interferometric testing using the Fizeau and Twyman-Green modes of interferometry for testing. The interferometer also provides capabilities for Shearing and Holographic modes of operations as well. The interferometer is generally shown at 16.

Figure 2:
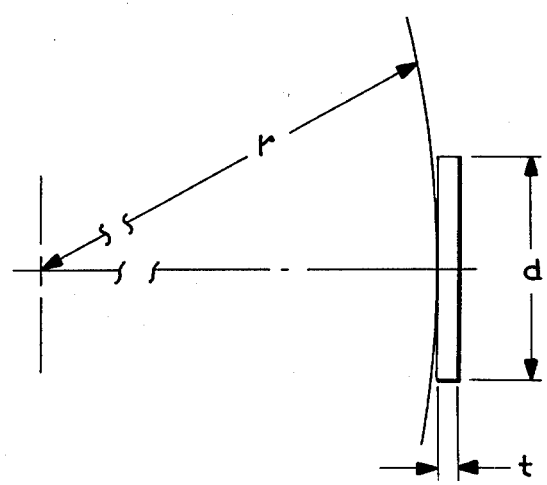
FIG. 2 shows the design of a typical KBr lens.
Figure 3:
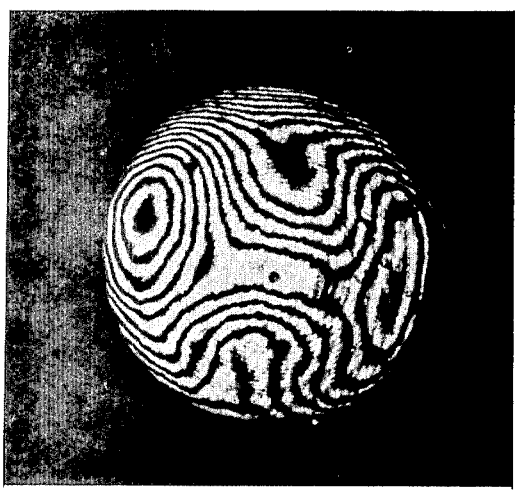
FIGS. 3a, b, c, d, e, f, shows the effect of various pressure increments on the lens.
Figure 3:
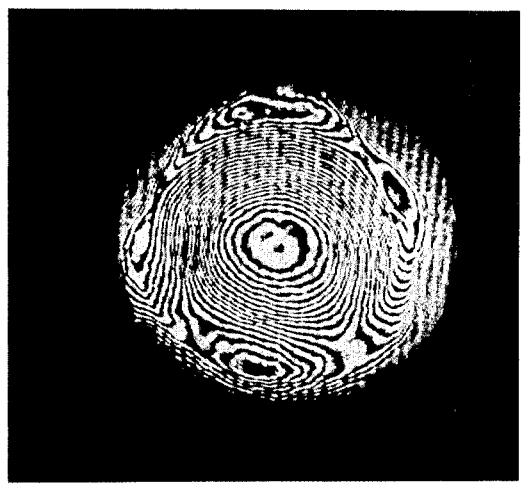
Figure 3:
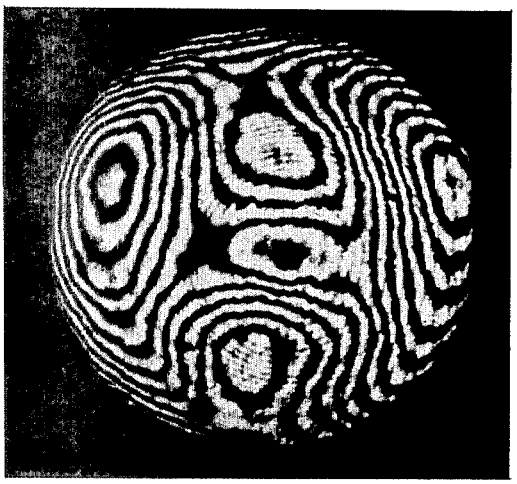
Figure 3:
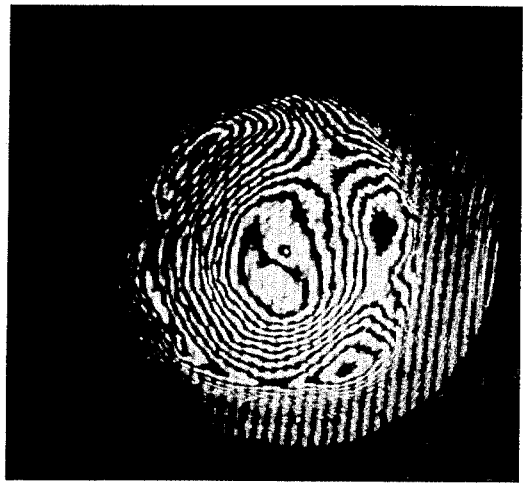
Figure 3:
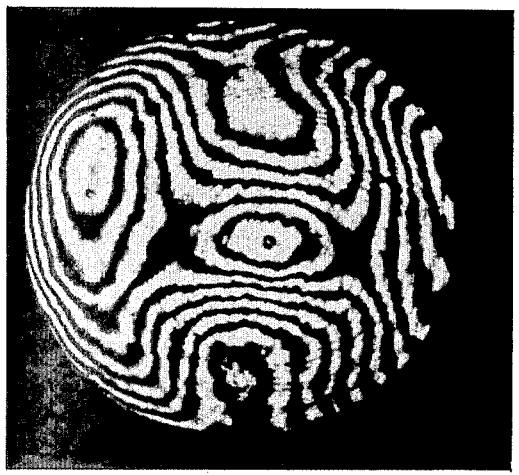
Figure 3:

In correcting the lens 10, it is inserted into the fixture 11 and the lens is subjected to bending repeatedly under incrementally increased pressure on either the plano face or the concave face until it is observed on the interferometer that the radius meets the design specifications and the plano side is flat. This procedure can be done at room temperature. FIG. 2 shows the general design parameter of one such KBr lens in which the overall lens diameter is about 2.5", the radius r is about 15" and the lens thickness is about 0.15". FIG. 3 shows by interferograms the effects of different pressure increments on this lens. FIGS. 3a, b, and c are of the concave side of the lens and FIGS. 3d, e and f are of the plano side. FIGS. 3a and d are after 44 psi has been applied, FIGS 3b and e after 48 psi has been applied and FIGS. 3c and f are the interferograms after 50 psi has been applied. Following the applied pressure of 44 psi the radius of curvature was already 0.2" longer measuring 14.77". The application of the 48 psi brought the radius of curvature out to 14.89", and flattened the plano side still more. After the application of 50 psi the radius of curvature was at 14.92" and the concave side had become spherical within several wavelengths. It is clear that the optical figure of both concave and plano faces of the lens has been improved substantially, the radius of the lens has been increased and that the plano side is flat to a few fringes. Tests over an extended period show that this correction in the lens is permanent and that there is no tendency to creep back to the original condition. It is to be understood that the pressure required for correction of a lens is a function of the strength of the material used and its structural shape and size.

The embodiments of the invention in which an exclusive property or right is claimed are defined as follows:

1. Apparatus for correction of forged halide optical elements comprising:

an enclosed chamber for supporting a forged halide optical element within the chamber, the chamber having resilient gas tight sealing and support means for the optical element, the chamber having an opening therein for direct viewing of the optical element supported therein;

means including controllable gas pressure regulator means for connecting a source of pressurized gas to said enclosed chamber so that a controllable gas pressure can be applied in said chamber, said gas pressure being thereby applied to the inner face of the supported optical element to cause deformation thereof to achieve a desired correction of said element; and, interferometer means positioned to view said optical element through said chamber opening to determine when the desired correction is achieved.

2. The apparatus according to claim 1 wherein said chamber comprises: an upper portion which is substantially disc shaped and has fastenable thereto in air tight relation a lower portion which is substantially cup shaped and which has said viewing opening located substantially axially in the bottom of said lower portion, with the remaining bottom as an inverted shoulder acting as a circular supporting ledge for said element, said ledge having said resilient gas tight sealing and support means therein.

3. The apparatus according to claim 1 wherein said interferometer means operates in the Fizeau mode.

4. The apparatus according to claim 1 wherein said interferometer means operates in the Twyman-Green mode.

5. A method for correction of forged halide optical elements comprising the steps of:
  providing a halide optical element to be corrected;
  providing an optical element supporting chamber which chamber supports the optical element at its perimeter, said chamber being gas tight when said optical element is in place;
  providing a controllable source of gas pressure into said chamber to exert a controllable pressure on one face of said optical element to cause a controlled correction deformation of said element; and,
  providing an interferometer to view the surface of the optical element and determine when the desired correction has been obtained.

6. The method according to claim 5 in which the optical element provided is selected from a group consisting of alkali halides and alkaline earth halides.

7. The method according to claim 5 in which the optical element provided is KBr.

8. The method according to claim 7 wherein the controllable pressure applied is in the range of about 25 to about 50 psi.

* * * * *